April 17, 1951  J. L. TRANT  2,549,265
REVERSIBLE SPLIT-PHASE MOTOR
Filed June 24, 1949
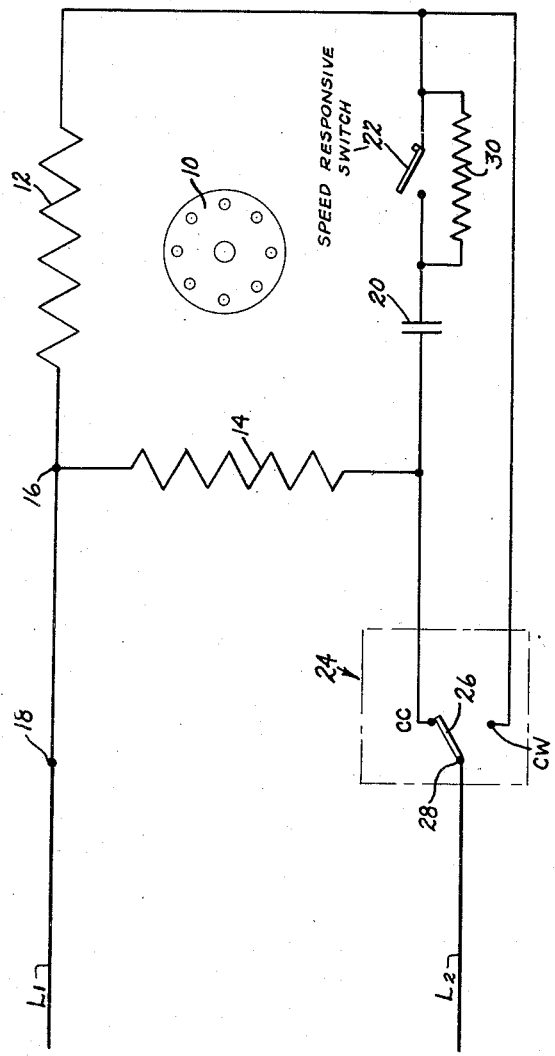
INVENTOR
JAMES L. TRANT
BY Toulmin & Toulmin
ATTORNEYS.

Patented Apr. 17, 1951

2,549,265

UNITED STATES PATENT OFFICE 2,549,265

REVERSIBLE SPLIT-PHASE MOTOR

James L. Trant, Dayton, Ohio, assignor to The Brown-Brockmeyer Co., Dayton, Ohio, a corporation of Ohio Application June 24, 1949, Serial No. 101,177

1 Claim. (Cl. 318—207)

This invention relates to electric motors, particularly split phase motors, and is especially concerned with an arrangement for making a split phase motor instantaneously reversible.

Split phase motors are well known and comprise a field having spaced windings therein, one of which is called the running winding and the other of which is called the starting winding. The motor is started by connecting the windings in parallel with a phase shifting reactance in series with the starting winding. This sets up a rotating field which drives the rotor in one direction, and there is usually provided a rotor mounted centrifugal switch which opens at a predetermined speed of the motor and interrupts the circuit through the starting winding.

Thereafter, the motor runs as a straight induction motor, with only the running winding energized.

A reversible split phase motor is shown and described in my co-pending application, Serial Number 83,031, filed March 23, 1949, and assigned to the same assignee as the instant application, and the present invention is a further inventive thought in connection with the same general art.

Such motors are usually uni-directional, but by making the starting and running windings identical, they can be made to operate in either direction by placing the phase shifting reactance in series with one or the other of the said windings.

It is the primary object of this invention to provide a motor of the type described above, and which is characterized by being instantly reversible at any time.

Another object of this invention is to provide a split phase motor which can be reversed at any time, and which is efficient in operation.

A still further object is the provision of an arrangement for making split phase motors reversible, and which arrangement is inexpensive and can readily be built into a substantially standard motor.

These and other objects and advantages will become more apparent upon reference to the following description taken in connection with the attached drawing which diagrammatically illustrates the preferred form which a circuit according to my invention takes.

Referring to the drawings somewhat more in detail, the motor shown therein comprises a rotor 10 preferably of the squirrel cage type and rotatably mounted in association with a pair of field windings 12 and 14 which are connected together at one end, as at 16, and having a terminal 18 to which one side of a single phase power circuit can be connected, as indicated by the power line L1.

Windings 12 and 14 are substantially identical, except that they are angularly displaced about the rotor an amount equal to or somewhat less than 90 electrical degrees.

Between the ends of windings 12 and 14 opposite their common juncture 16, there is connected the phase shifting reactance 20 and the centrifugal switch 22 which is in series with the said reactance. As shown, the reactance 20 is a condenser or capacitor and is preferably of the electrolytic type. The capacitor is of such a size that when it is connected in series with either of the windings 12 or 14 there will be a shift in phase of the current through that winding approximately equally the number of degrees the windings are displaced about the rotor 10.

The end of winding 14 opposite junction 16 is connected with the terminal of a switch 24 that is marked CC, whereas the end of winding 12 opposite junction 16 is connected with the contact of switch 24 and is marked CW. Switch 24 includes a blade 26 movable into engagement with either contact CC or contact CW and permanently connected with a terminal 28 to which is connected the other side L2 of the single phase power circuit previously referred to.

According to this invention, there is a current limiting reactance 30 shunted across switch 22 so that opening of switch 22 is effective for reducing the current flowing through capacitor 20 but does not completely interrupt the circuit through the said capacitor. It will be understood that switch 22 is preferably mounted on the rotor shaft so as to be responsive to the speed of the operation of the motor or is arranged to be acted on by a centrifugal governor mounted on the rotor shaft so that when the rotor reaches a predetermined speed in either direction, the switch will be opened. Similarly, when the rotor speed falls to a predetermined amount, switch 22 will automatically close.

The operation of the circuit according to my invention will now be described:

With switch blade 26 closed on contact CC, winding 14 is connected directly between power lines L1 and L2, whereas winding 12 is connected between lines L1 and L2 in series with capacitor 20 and switch 22. Assuming the rotor of the motor to be at rest, if the power circuit is now energized, the rotor 10 will commence to turn in a counterclockwise direction. When the rotor reaches a predetermined speed, switch 22 will automatically open. At this time the current passing through winding 12 and capacitor 20 will be substantially reduced because the current limiting reactance 30 is now in series therewith.

Inasmuch as there is no substantial change in the phase angle of the current passing through winding 12, the field from the said winding may still contribute toward the rotor torque. However, even if the phase angle of the current through winding 12 is somewhat different than the angular displacement between windings 12 and 14, this will have no material effect on the rotor torque, because there is no change in the direction of rotation of the motor field.

At this time, it will be noted that current limiting reactance 30 is preferably a resistor, but that other types of reactances could be employed and substantially equivalent results would obtain.

If, now, it is desired to reverse the direction of rotation of rotor 10, switch blade 26 is moved into contact with terminal CW. This movement of blade 26 will connect winding 12 directly between lines L1 and L2 and will connect winding 14 in series with capacitor 20 and resistor 30, between the said power lines.

It will be evident that the direction of rotation of the motor field is now opposite to the direction of rotation of rotor 10, and that the said field will, accordingly, have a decelerating effect on the said rotor. This deceleration of the rotor will cause it to slow down, and when it has slowed down a predetermined amount, switch 22 will close and the full effect of a rotating starting field will be had on rotor 10 which will quickly brake it to a halt and accelerate it toward full speed operation in the opposite direction.

When the rotor reaches a predetermined speed in the said opposite direction, switch 22 will again open and the same conditions of operation as described above will obtain, except that rotor 10 is now running in the opposite direction.

It will be evident that rotor 10 can be substantially instantaneously reversed at any time merely by manipulation of blade 26 of switch 24, and that, apart from the fact that resistor 30 is shunted across switch 22 and switch 24 is connected in circuit, the motor is substantially conventional with identical starting and running windings.

In connection with maintaining capacitor 20 in circuit all the time the motor is operating, it will be noted that this has a tendency to improve the power factor of the motor circuit so the motor operates more efficiently. The amount of power factor correction obtained in this manner will, of course, be at least partly dependent on the size of resistor 30, and this resistor is selected with that factor in mind and also with the view of reducing the voltage across capacitor 20 after switch 22 opens, thereby permitting the use of an electrolytic condenser as the capacitor.

It will be evident that while I have shown switch 24 to be manually operated, this element could be controlled in a number of other manners, if so desired, as, for example, by a movable machine part being reciprocated by rotor 10, by the remotely operated relay system, or by other devices.

It will also be evident that while I have shown resistor 30 as shunted across switch 22 in order to maintain capacitor 20 in circuit with the starting winding at all times, the said resistor could be replaced by a suitable reactance shunted across both capacitor 20 and switch 22 and the said reactance be characterized by drawing the amount of current desired and at the proper phase angle after switch 22 had opened.

It will be understood that this invention is susceptible to modification in order to adapt it to different usages and conditions, and, accordingly, it is desired to comprehend such modifications within this invention as may fall within the scope of the appended claim.

I claim:

In a split phase motor having two angularly related identical field windings and a condenser, a manual switch having a first position wherein said windings are in parallel with the condenser in series with one thereof and a second position wherein the windings are in parallel with the condenser in series with the other thereof, a centrifugal switch responsive to a predetermined motor speed for interrupting the circuit through said condenser and its associated winding for either direction of rotation of the motor, and means comprising a resistor shunted directly across the terminals of said centrifugal switch for maintining said condenser in effect in said circuit after opening of said centrifugal switch.

JAMES L. TRANT.

REFERENCES CITED

The following references are of record in the file of this patent:

UNITED STATES PATENTS

| Number | Name | Date |
|---|---|---|
| 1,024,635 | Kunkel | Apr. 30, 1912 |
| 1,944,090 | Lukens | Jan. 16, 1934 |
| 2,063,311 | Guedon et al. | Dec. 8, 1936 |
| 2,195,287 | Schaefer | Mar. 26, 1940 |
| 2,320,419 | Ellis | Jan. 1, 1943 |
| 2,408,369 | Brongersma | Oct. 1, 1946 |
| 2,442,456 | Boyden et al. | June 1, 1948 |
| 2,478,848 | Sullivan et al. | Aug. 9, 1949 |

FOREIGN PATENTS

| Number | Country | Date |
|---|---|---|
| 319,684 | Great Britain | May 8, 1930 |
| 598,544 | Germany | Apr. 6, 1929 |
| 415,853 | Great Britain | Sept. 6, 1934 |